(12) United States Patent
Chen

(10) Patent No.: US 11,954,691 B2
(45) Date of Patent: Apr. 9, 2024

(54) PAYMENT TWO-DIMENSIONAL CODE SECURE PAYMENT METHOD AND SYSTEM WITHOUT TWO-STEP AUTHENTICATION

(71) Applicant: CIENET TECHNOLOGIES (BEIJING) CO., LTD., Beijing (CN)

(72) Inventor: Linghong Chen, Beijing (CN)

(73) Assignee: CIENET TECHNOLOGIES (BEIJING) CO., LTD., Beijing (CN)

( * ) Notice: Subject to any disclaimer, the term of this patent is extended or adjusted under 35 U.S.C. 154(b) by 370 days.

(21) Appl. No.: 17/303,958

(22) Filed: Jun. 10, 2021

(65) Prior Publication Data

US 2021/0304209 A1 Sep. 30, 2021

Related U.S. Application Data

(63) Continuation of application No. PCT/CN2019/124471, filed on Dec. 11, 2019.

(51) Int. Cl.
*G06Q 20/40* (2012.01)
*G06K 19/06* (2006.01)
*G06Q 20/32* (2012.01)

(52) U.S. Cl.
CPC ..... *G06Q 20/4097* (2013.01); *G06Q 20/3276* (2013.01); *G06K 19/06037* (2013.01)

(58) Field of Classification Search
None
See application file for complete search history.

(56) References Cited

U.S. PATENT DOCUMENTS

| | | | |
|---|---|---|---|
| 2005/0121512 A1* | 6/2005 | Wankmueller | G06Q 20/40 235/487 |
| 2016/0314455 A1* | 10/2016 | Liou | G06Q 20/3274 |
| 2017/0104593 A1* | 4/2017 | Vo | G09C 5/00 |
| 2018/0268403 A1* | 9/2018 | Guglani | G06Q 20/3829 |
| 2019/0205587 A1* | 7/2019 | Ling | G06Q 20/347 |

FOREIGN PATENT DOCUMENTS

KR 20110115107 A * 10/2011

* cited by examiner

*Primary Examiner* — Edward Chang
*Assistant Examiner* — Divesh Patel
(74) *Attorney, Agent, or Firm* — George Guosheng Wang; Upstream Research and Patent LLC

(57) ABSTRACT

A payment two-dimensional code secure payment method and system without two-step authentication. The method comprises the following steps: by means of a payment application, producing a first payment two-dimensional code and a second payment two-dimensional code, and alternately displaying the first payment two-dimensional code and the second payment two-dimensional code; respectively identifying the first payment two-dimensional code and the second payment two-dimensional code to acquire complete payment information; sending the complete payment information to a payment centre for verification; when verification is successful, the payment is complete. The present method effectively avoids the property loss incurred by users due to scanning of payment two-dimensional code pictures, and increases payment security.

5 Claims, 3 Drawing Sheets

US 11,954,691 B2

PAYMENT TWO-DIMENSIONAL CODE SECURE PAYMENT METHOD AND SYSTEM WITHOUT TWO-STEP AUTHENTICATION

BACKGROUND

Technical Field

The present invention relates to a payment two-dimensional code secure payment method without two-step authentication, and also relates to a system for realizing the method.

Related Art

A two-dimensional bar code, as a carrier of information and also an important method and means for information collection and transmission, can play a role of improving the efficiency in various fields. With the promotion of intelligent terminals and rapid popularization of mobile networks, the two-dimensional bar code has become a window to the future data era. The two-dimensional bar code technology is widely used in fields such as mobile e-commerce, fast text entry, and food safety management.

The application of the two-dimensional bar code has shortened the distance between consumers and enterprises. Mobile payment is a convenient and fast payment method that has emerged in recent years, and has quickly occupied a considerable share of the payment market. More and more mobile phone applications include a payment function, among which Alipay and WeChat Pay both have a function of displaying personal two-dimensional bar code payment. This feature makes it easy for a merchant to scan a personal payment two-dimensional bar code to complete online transaction payment.

However, in the current mechanism, there is a security risk after the payment two-dimensional bar code is screenshot or photographed. Although the new version of WeChat Pay adds some security mechanisms, such as: a random payment two-dimensional bar code is generated; the generated payment two-dimensional bar code is only valid for limited time; the payment two-dimensional bar code can only be used once, etc., but there are still hidden security risks after these payment two-dimensional bar codes are screenshot or photographed. Since the existing mechanism cannot distinguish a two-dimensional bar code generated by a mobile phone application from its screenshot. If the generated two-dimensional bar code is not used for a short period of time, the screenshot of the payment two-dimensional bar code can still be used by an embezzler.

In order to solve the above-mentioned problems, a new mechanism is proposed in a secure payment method and system for payment two-dimensional bar code, and can distinguish an original two-dimensional bar code generated by the mobile phone application and a screenshot or photographed two-dimensional bar code. Even if the screenshot of the two-dimensional bar code is taken maliciously, there will be no security concerns. However, this mechanism requires two-step authentication in the background to distinguish the original two-dimensional bar code from the screenshot or photographed two-dimensional bar code. The addition of two-step authentication in the background will also have a higher requirement for the network stability of the entire payment process. That is, adding the two-step authentication in the background will increase the possibility of failing to complete the two-step authentication due to network instability, thus indirectly increasing the failure rate of a legal payment process.

SUMMARY

In view of the deficiencies in the prior art, the first technical problem that the present invention needs to solve is to provide a payment two-dimensional code secure payment method without two-step authentication.

Another technical problem that the present invention needs to solve is to provide a payment two-dimensional code secure payment system without two-step authentication.

To achieve the foregoing objective of the present invention, the following technical solutions are used in the present invention.

According to a first aspect of the embodiments of the present invention, a payment two-dimensional code secure payment method without two-step authentication is provided, including the following steps:
  generating a first payment two-dimensional bar code and a second payment two-dimensional bar code by means of a payment application, and alternately displaying the first payment two-dimensional bar code and the second payment two-dimensional bar code; and
  respectively identifying the first payment two-dimensional bar code and the second payment two-dimensional bar code to obtain intact payment information, sending the intact payment information to a payment center for verification, and if the verification succeeds, ending the payment.

Preferably, the first payment two-dimensional bar code and the second payment two-dimensional bar code are simultaneously generated.

Preferably, the first payment two-dimensional bar code and the second payment two-dimensional bar code are a pair of two-dimensional bar codes; and an account of a user and payment information are split and stored in the pair of two-dimensional bar codes.

Preferably, the first payment two-dimensional bar code and the second payment two-dimensional bar code satisfy the following relations:
  1) the first payment two-dimensional bar code and the second payment two-dimensional bar code each include a unique transaction number;
  2) the account and the payment related information are split and stored in the first payment two-dimensional bar code and the second payment two-dimensional bar code;
  3) the first payment two-dimensional bar code and the second payment two-dimensional bar code respectively encrypt the stored payment related information; and
  4) the first payment two-dimensional bar code stores a key that parses payment information of the second payment two-dimensional bar code, and the second payment two-dimensional bar code stores a key that parses payment information of the first payment two-dimensional bar code.

Preferably, the respectively identifying the first payment two-dimensional bar code and the second payment two-dimensional bar code to obtain intact payment information, and sending the intact payment information to a payment center for verification includes the following steps:
  acquiring a plurality of two-dimensional bar code images by multiple scanning of the first payment two-dimensional bar code and the second payment two-dimensional bar code which are alternately displayed by the payment application;

respectively acquiring a key stored in the first payment two-dimensional bar code and a key stored in the second payment two-dimensional bar code after determining that the plurality of two-dimensional bar code images include a group of intact payment two-dimensional bar codes;

parsing payment information of the second payment two-dimensional bar code with the key stored in the first payment two-dimensional bar code, and parsing payment information of the first payment two-dimensional bar code with the key stored in the second payment two-dimensional bar code; and combining the payment information of the first payment two-dimensional bar code with the payment information of the second payment two-dimensional bar code, and transmitting the combined payment information to the payment center for verification.

Preferably, the acquiring a plurality of two-dimensional bar code images by multiple scanning of the first payment two-dimensional bar code and the second payment two-dimensional bar code which are alternately displayed by the payment application includes the following steps:

acquiring a frequency t of the payment application for alternately displaying the first payment two-dimensional bar code and the second payment two-dimensional bar code, wherein t is an integer; and identifying the payment two-dimensional bar codes displayed by the payment application at a frequency of 0.5 t for multiple times, and ending the identification till the plurality of two-dimensional bar code images are determined to include a group of intact payment two-dimensional bar codes.

Preferably, a process of determining that the plurality of two-dimensional bar code images include a group of intact payment two-dimensional bar codes is as follows:

determining that the plurality of two-dimensional bar code images include a group of intact payment two-dimensional bar codes when the plurality of two-dimensional bar codes include two pieces of two-dimensional bar code information that are different.

According to a second aspect of the embodiments of the present invention, a payment two-dimensional code secure payment system without two-step authentication is provided, including a processor and a memory. The memory stores a computer program operable on the processor. The computer program, when executed by the processor, realizes the following steps:

generating a first payment two-dimensional bar code and a second payment two-dimensional bar code by means of a payment application, and alternately displaying the first payment two-dimensional bar code and the second payment two-dimensional bar code; and respectively identifying the first payment two-dimensional bar code and the second payment two-dimensional bar code to obtain intact payment information, sending the intact payment information to a payment center for verification, and if the verification succeeds, ending the payment.

In the payment two-dimensional code secure payment method without two-step authentication provided by the present invention, by means of setting two payment two-dimensional bar codes, the account and the payment related information are separately stored in the two different payment two-dimensional bar codes and then respectively encrypted; the key of the current payment two-dimensional bar code is saved by the other payment two-dimensional bar code, which effectively avoids property loss of the user due to scanning of a payment two-dimensional bar code image and improves the security of payment.

DETAILED DESCRIPTION

The technical content of the present invention is specifically described in detail below in combination with the accompanying drawings and specific embodiments.

The present invention provides a payment two-dimensional code secure payment method without two-step authentication, by which an original two-dimensional bar code generated by a mobile phone application and a screenshot or photographed two-dimensional bar code are distinguished without two-step authentication in the background, so that even if a screenshot of a two-dimensional bar code is taken maliciously, there will be no security concerns.

Figure 1:
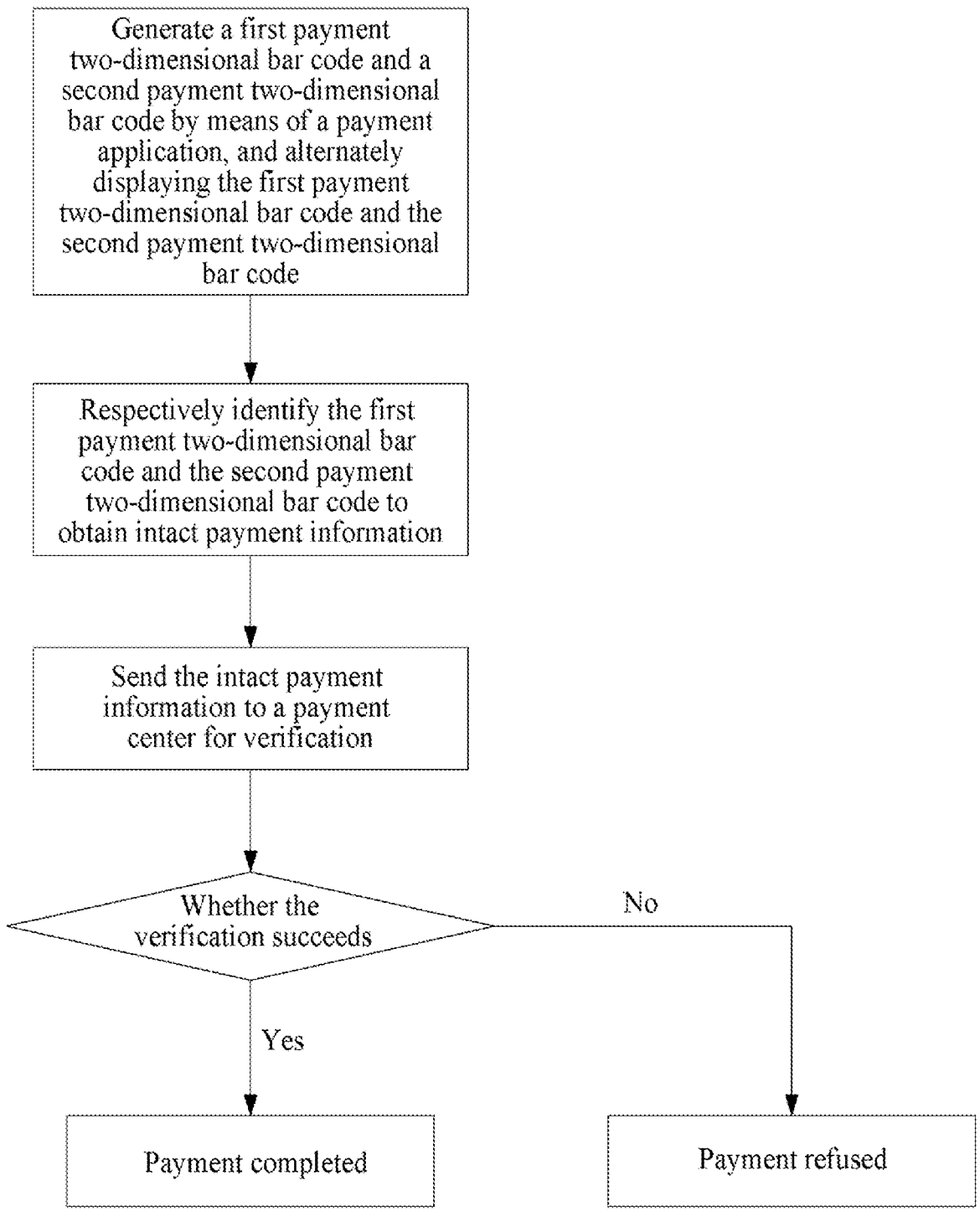
FIG. 1 is a flowchart of a payment two-dimensional code secure payment method without two-step authentication provided by the present invention.

As shown in FIG. 1, the payment two-dimensional code secure payment method without two-step authentication provided by the present invention includes the following steps: firstly, a first payment two-dimensional bar code and a second payment two-dimensional bar code are generated by means of a payment application, and the first payment two-dimensional bar code and the second payment two-dimensional bar code are alternately displayed; and then, the first payment two-dimensional bar code and the second payment two-dimensional bar code are respectively identified to obtain intact payment information, the intact payment information is sent to a payment center for verification, and if the verification succeeds, the payment ends. This process is specifically described in detail below.

S1: A first payment two-dimensional bar code and a second payment two-dimensional bar code are generated by means of a payment application, and the first payment two-dimensional bar code and the second payment two-dimensional bar code are alternately displayed.

Figure 2:
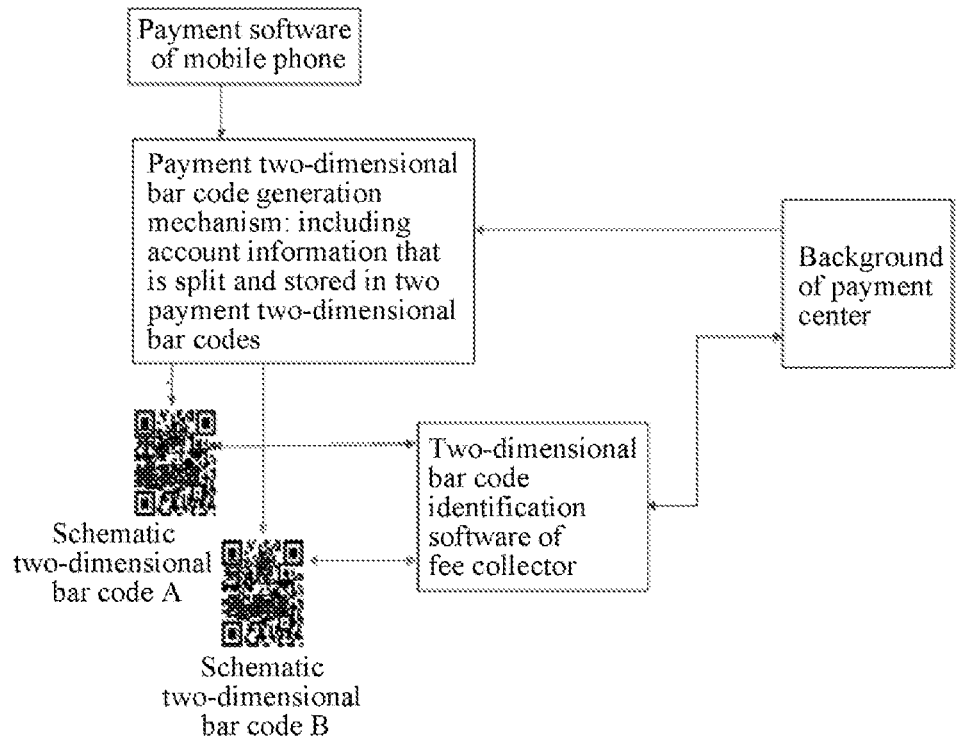
FIG. 2 is a flowchart of normally generating a payment two-dimensional bar code for payment in one embodiment provided by the present invention.

Payment software (the payment application) of a mobile terminal generates the first payment two-dimensional bar code and the second payment two-dimensional bar code (schematic two-dimensional bar code A and schematic two-dimensional bar code B as shown in FIG. 2) when a user needs to pay for a commodity or service selected. The payment software may be WeChat, Alipay, or other application programs that can use a two-dimensional bar code to pay. The first payment two-dimensional bar code and the second payment two-dimensional bar code are simultaneously generated, and form a pair of two-dimensional bar codes. The account and the payment related information of the user are split and stored in this pair of two-dimensional bar codes, and satisfy the following conditions.

1) The schematic two-dimensional bar code A (the first payment two-dimensional bar code) and the schematic two-dimensional bar code B (the second payment two-dimensional bar code) both include a unique transaction number of this time: for example, an identification number of the schematic two-dimensional bar code A is 1223457A, and an identification number of the schematic two-dimensional bar code B is 1223457B.
2) The account and the payment related information are split and stored in the first payment two-dimensional bar code and the second payment two-dimensional bar code. Part of the account of current payment and part of the payment information are stored in the schematic two-dimensional bar code A; and the other part of the account of the current payment and the other part of the payment information are stored in the schematic two-dimensional bar code B. The payment related information can be all information related to the current payment, including, but not limited to, the amount of the payment and the account information.
3) The first payment two-dimensional bar code and the second payment two-dimensional bar code respectively encrypt the stored payment related information.
4) The first payment two-dimensional bar code stores a key that parses the payment information of the second payment two-dimensional bar code, and the second payment two-dimensional bar code stores a key that parses the payment information of the first payment two-dimensional bar code.

The payment software alternately displays the schematic two-dimensional bar code A and the schematic two-dimensional bar code B on a mobile phone screen at a frequency of t times/second. ($t \leq 10$).

S2: The first payment two-dimensional bar code and the second payment two-dimensional bar code are respectively identified to obtain intact payment information, the intact payment information is sent to a payment center for verification, and if the verification succeeds, the payment ends.

The step that the first payment two-dimensional bar code and the second payment two-dimensional bar code are respectively identified to obtain intact payment information, and the intact payment information is sent to a payment center for verification includes the following steps.

S21: A plurality of two-dimensional bar code images are acquired by multiple scanning of the first payment two-dimensional bar code and the second payment two-dimensional bar code which are alternately displayed by the payment application.

S22: A key stored in the first payment two-dimensional bar code and a key stored in the second payment two-dimensional bar code are respectively acquired after it is determined that the plurality of two-dimensional bar code images include a group of intact payment two-dimensional bar codes.

S23: The payment information of the second payment two-dimensional bar code is parsed with the key stored in the first payment two-dimensional bar code, and the payment information of the first payment two-dimensional bar code is parsed with the key stored in the second payment two-dimensional bar code.

S24: The payment information of the first payment two-dimensional bar code is combined with the payment information of the second payment two-dimensional bar code, and the combined payment information is transmitted to the payment center for verification.

Specifically, A fee collector scans a payment two-dimensional bar code for multiple times through two-dimensional bar code identification software. In the embodiments provided by the present invention, the step that a plurality of two-dimensional bar code images are acquired by multiple scanning of the first payment two-dimensional bar code and the second payment two-dimensional bar code which are alternately displayed by the payment application includes the following steps:

acquiring a frequency t of the payment application for alternately displaying the first payment two-dimensional bar code and the second payment two-dimensional bar code, wherein t is an integer and can be set as required;

identifying the payment two-dimensional bar codes displayed by the payment application at a frequency of 0.5 t for multiple times, and ending the identification till the plurality of two-dimensional bar code images are determined to include a group of intact payment two-dimensional bar codes. That is, the fee collector scans the payment two-dimensional bar codes for multiple times through the two-dimensional code identification software at 0.5 t, 1 t, and 1.5 t (the scanning frequency may be optimized according to applications), the purpose of which is to ensure that a group of intact payment two-dimensional bar codes displayed by the mobile phone application can be scanned. In the embodiments provided by the present invention, a process of determining that the plurality of two-dimensional bar code images include a group of intact payment two-dimensional bar codes is as follows: determining that the plurality of two-dimensional bar code images include a group of intact payment two-dimensional bar codes when the plurality of two-dimensional bar codes include two pieces of two-dimensional bar code information that are different. The account and part of the payment information in the schematic two-dimensional bar code B are parsed with the key in the schematic two-dimensional bar code A, and part of the information in the schematic two-dimensional bar code A is parsed with the key in the schematic two-dimensional bar code B. The combined intact payment information is then transmitted to the background of the payment center.

The payment center identifies, according to received account information, whether the intact payment information is valid payment information, and then sends confirmation information to a payer, and the payment ends.

Scanning a two-dimensional bar code screenshot or picture by the two-dimensional bar code identification software of the fee collector is taken as an example below to further explain the validity of the payment two-dimensional code secure payment method without two-step authentication provided by the present invention.

Figure 3:
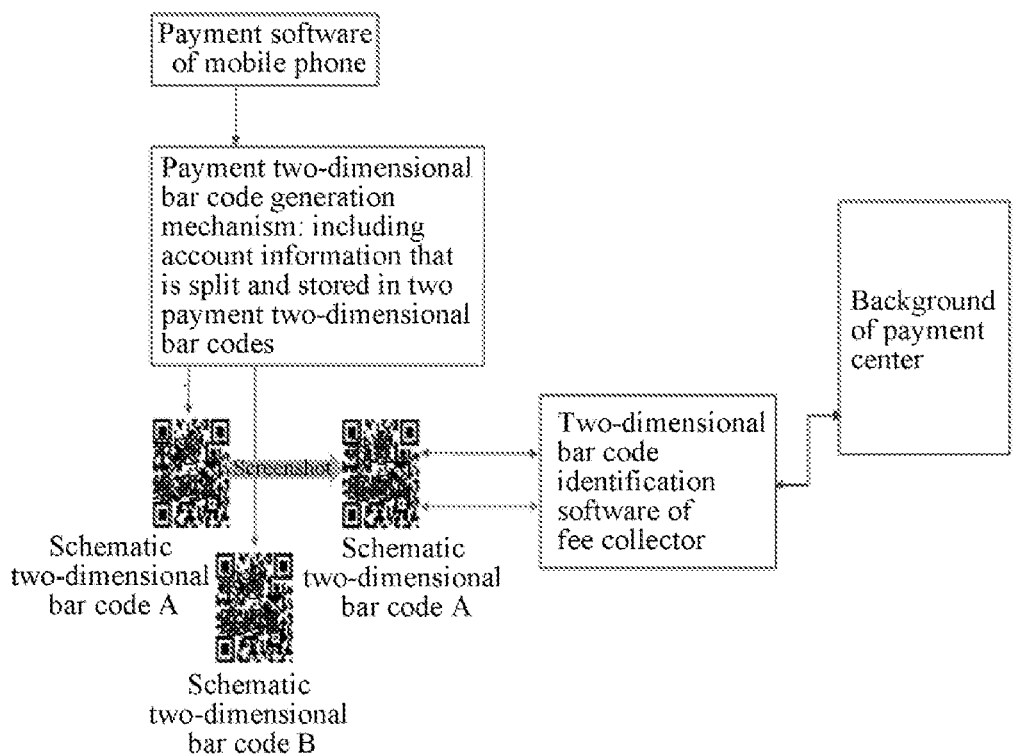
FIG. 3 is a flowchart of using a payment two-dimensional bar code screenshot for payment in one embodiment provided by the present invention.

When a user needs to pay for a commodity or service selected, payment software of a mobile phone generates a pair of payment two-dimensional bar codes at the same time (i.e., schematic two-dimensional bar code A and schematic two-dimensional bar code B as shown in FIG. 3). An account and payment related information are split and stored in this pair of payment two-dimensional bar codes, and satisfy the following conditions:

1) The schematic two-dimensional bar code A and the schematic two-dimensional bar code B both include a unique transaction number of this time: for example, an identification number of the schematic two-dimensional bar code A is 1223457A, and an identification number of the schematic two-dimensional bar code B is 1223457B.

2) Part of the account of current payment and part of the payment information are stored in the schematic two-dimensional bar code A; and the other part of the account of the current payment and the other part of the payment information are stored in the schematic two-dimensional bar code B.
3) The schematic two-dimensional bar code A and the schematic two-dimensional bar code B respectively encrypt the stored payment related information.
4) The schematic two-dimensional bar code A stores a key that parses the payment information of the schematic two-dimensional bar code B, and the schematic two-dimensional bar code B stores a key that parses the payment information of the schematic two-dimensional bar code A.

The payment software alternately displays the schematic two-dimensional bar code A and the schematic two-dimensional bar code B on a mobile phone screen at a frequency of t times/second.

If one of the payment two-dimensional bar codes is photographed or screenshot, the fee collector scans the screenshot of the payment two-dimensional bar code through the two-dimensional code identification software and scans the screenshot of the payment two-dimensional bar code through the two-dimensional code identification software again at 0.5 t, 1 t, and 1.5 t (the scanning frequency may be optimized according to applications). Since it is a picture or a screenshot, the two-dimensional bar codes scanned by the software of the fee collector are the same two-dimensional bar code, the intact payment information cannot be acquired, and the authentication fails. The transaction number and a warning are sent to the background of the payment center for filing. This effectively avoids the property loss of the user generated due to the scanning of a payment two-dimensional bar code picture, and improves the security of payment.

Figure 4:
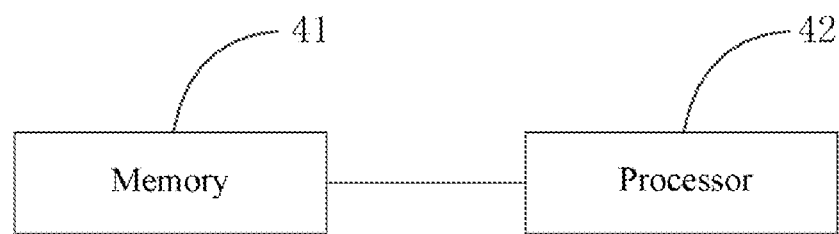
FIG. 4 is a schematic structural diagram of a payment two-dimensional code secure payment system without two-step authentication provided by the present invention.

The present invention further provides a payment two-dimensional code secure payment system without two-step authentication. As shown in FIG. 4, the system includes a processor 42 and a memory 41 that stores an instruction executable in the processor 42.

The processor 42 may be a general-purpose processor, such as a central processing unit (CPU), may also be a digital signal processor (DSP) and an application-specific integrated circuit (ASIC), or is configured to be one or more integrated circuits that implement the embodiments of the present invention.

The memory 41 is used to store program code and transmit the program code to the CPU. The memory 41 may include a volatile memory, such as a random access memory (RAM). The memory 41 may also include a non-volatile memory, such as a read-only memory, a flash memory, a hard disk, or a solid-state disk. The memory 41 may also include a combination of the aforementioned types of memories.

Specifically, the secure payment system for the payment two-dimensional bar code without two-step authentication provided by the embodiments of the present invention includes the processor 42 and the memory 41. The memory 41 stores a computer program operable on the processor 42. The computer program, when executed by the processor 42, realizes the following steps:
generating a first payment two-dimensional bar code and a second payment two-dimensional bar code by means of a payment application, and alternately displaying the first payment two-dimensional bar code and the second payment two-dimensional bar code; and
respectively identifying the first payment two-dimensional bar code and the second payment two-dimensional bar code to obtain intact payment information, sending the intact payment information to a payment center for verification, and if the verification succeeds, ending the payment.

The computer program, when executed by the processor 42, realizes the following steps:
simultaneously generating the first payment two-dimensional bar code and the second payment two-dimensional bar code.

The computer program, when executed by the processor 42, realizes the following steps:
the first payment two-dimensional bar code and the second payment two-dimensional bar code being a pair of two-dimensional bar codes, and splitting and storing an account of a user and payment information in the pair of two-dimensional bar codes.

The computer program, when executed by the processor 42, realizes the following steps:
the first payment two-dimensional bar code and the second payment two-dimensional bar code satisfying the following relations:
1) the first payment two-dimensional bar code and the second payment two-dimensional bar code each include a unique transaction number;
2) the account and the payment related information are split and stored in the first payment two-dimensional bar code and the second payment two-dimensional bar code;
3) the first payment two-dimensional bar code and the second payment two-dimensional bar code respectively encrypt the stored payment related information; and
4) the first payment two-dimensional bar code stores a key that parses payment information of the second payment two-dimensional bar code, and the second payment two-dimensional bar code stores a key that parses payment information of the first payment two-dimensional bar code.

When the first payment two-dimensional bar code and the second payment two-dimensional bar code are respectively identified to obtain intact payment information, and the intact payment information is sent to a payment center for verification, the computer program is executed by the processor 42 to realize the following steps:
acquiring a plurality of two-dimensional bar code images by multiple scanning of the first payment two-dimensional bar code and the second payment two-dimensional bar code which are alternately displayed by the payment application;
respectively acquiring a key stored in the first payment two-dimensional bar code and a key stored in the second payment two-dimensional bar code after determining that the plurality of two-dimensional bar code images include a group of intact payment two-dimensional bar codes;
parsing payment information of the second payment two-dimensional bar code with the key stored in the first payment two-dimensional bar code, and parsing payment information of the first payment two-dimensional bar code with the key stored in the second payment two-dimensional bar code; and
combining the payment information of the first payment two-dimensional bar code with the payment information of the second payment two-dimensional bar code, and transmitting the combined payment information to the payment center for verification.

When a plurality of two-dimensional bar code images are acquired by multiple scanning of the first payment two-dimensional bar code and the second payment two-dimensional bar code which are alternately displayed by the payment application, the computer program is executed by the processor 42 to realize the following steps:

acquiring a frequency t of the payment application for alternately displaying the first payment two-dimensional bar code and the second payment two-dimensional bar code, wherein t is an integer; and identifying the payment two-dimensional bar codes displayed by the payment application at a frequency of 0.5 t for multiple times, and ending the identification till the plurality of two-dimensional bar code images are determined to include a group of intact payment two-dimensional bar codes.

When it is determined that the plurality of two-dimensional bar code images include a group of intact payment two-dimensional bar codes, the computer program is executed by the processor 42 to realize the following steps:

determining that the plurality of two-dimensional bar code images include a group of intact payment two-dimensional bar codes when the plurality of two-dimensional bar codes include two pieces of two-dimensional bar code information that are different.

An embodiment of the present invention further provides a computer readable storage medium. The computer-readable storage medium here stores one or more programs. The computer-readable storage medium may include a volatile memory, such as a random access memory. The memory may also include a non-volatile memory, such as a read-only memory, a flash memory, a hard disk, or a solid-state disk. The memory may also include a combination of the aforementioned types of memories. The one or more programs in the computer-readable storage medium is executable by one or more processors to realize part or all steps used to realize the payment two-dimensional code secure payment method without two-step authentication in the above method embodiment.

The above provides a detailed description of the payment two-dimensional code secure payment method and system without two-step authentication provided by the present invention. Any obvious modification made on the invention by a person of ordinary skill in the art without departing from the essence of the invention will constitute a patent infringement of the invention, and a person of ordinary skill in the art is to undertake corresponding legal liability.

The invention claimed is:

1. A payment two-dimensional code secure payment method without two-step authentication, comprising the following steps:

simultaneously generating a first payment two-dimensional bar code and a second payment two-dimensional bar code by means of a payment application, wherein the first payment two-dimensional bar code and the second payment two-dimensional bar code are a pair of two-dimensional bar codes; and an account of a user and payment information are split and stored in the pair of two-dimensional bar codes; and the first payment two-dimensional bar code and the second payment two-dimensional bar code satisfy the following relations:

1) the first payment two-dimensional bar code and the second payment two-dimensional bar code each comprise a unique transaction number;

2) the account and the payment information are split and stored in the first payment two-dimensional bar code and the second payment two-dimensional bar code;

3) the first payment two-dimensional bar code and the second payment two-dimensional bar code respectively encrypt the payment information; and 4) the first payment two-dimensional bar code stores a key that parses payment information of the second payment two-dimensional bar code, and the second payment two-dimensional bar code stores a key that parses payment information of the first payment two-dimensional bar code;

alternately displaying the first payment two-dimensional bar code and the second payment two-dimensional bar code; and respectively identifying the first payment two-dimensional bar code and the second payment two-dimensional bar code to obtain intact payment information, sending the intact payment information to a payment center for verification, and if the verification succeeds, ending the payment.

2. The payment two-dimensional code secure payment method without two-step authentication according to claim 1, wherein the respectively identifying the first payment two-dimensional bar code and the second payment two-dimensional bar code to obtain intact payment information, and sending the intact payment information to a payment center for verification comprises the following steps:

acquiring a plurality of two-dimensional bar code images by multiple scanning of the first payment two-dimensional bar code and the second payment two-dimensional bar code which are alternately displayed by the payment application;

respectively acquiring a key stored in the first payment two-dimensional bar code and a key stored in the second payment two-dimensional bar code after determining that the plurality of two-dimensional bar code images comprise a group of intact payment two-dimensional bar codes;

parsing payment information of the second payment two-dimensional bar code with the key stored in the first payment two-dimensional bar code, and parsing payment information of the first payment two-dimensional bar code with the key stored in the second payment two-dimensional bar code; and combining the payment information of the first payment two-dimensional bar code with the payment information of the second payment two-dimensional bar code, and transmitting the combined payment information to the payment center for verification.

3. The payment two-dimensional code secure payment method without two-step authentication according to claim 2, wherein the acquiring a plurality of two-dimensional bar code images by multiple scanning of the first payment two-dimensional bar code and the second payment two-dimensional bar code which are alternately displayed by the payment application comprises the following steps:

acquiring a frequency t of the payment application for alternately displaying the first payment two-dimensional bar code and the second payment two-dimensional bar code, wherein t is an integer; and identifying the payment two-dimensional bar codes displayed by the payment application at a frequency of 0.5 t for multiple times, and ending the identification till the plurality of two-dimensional bar code images are determined to comprise a group of intact payment two-dimensional bar codes.

4. The payment two-dimensional code secure payment method without two-step authentication according to claim 3, wherein a process of determining that the plurality of two-dimensional bar code images comprise a group of intact payment two-dimensional bar codes is as follows:
  determining that the plurality of two-dimensional bar code images comprise a group of intact payment two-dimensional bar codes when the plurality of two-dimensional bar codes comprise two pieces of two-dimensional bar code information that are different.

5. A payment two-dimensional code secure payment system without two-step authentication, comprising a processor and a memory, wherein the memory stores a computer program operable on the processor; and the computer program, when executed by the processor, realizes the following steps:
  simultaneously generating a first payment two-dimensional bar code and a second payment two-dimensional bar code by means of a payment application, wherein the first payment two-dimensional bar code and the second payment two-dimensional bar code are a pair of two-dimensional bar codes; and an account of a user and payment information are split and stored in the pair of two-dimensional bar codes; and the first payment two-dimensional bar code and the second payment two-dimensional bar code satisfy the following relations:
  1) The first payment two-dimensional bar code and the second payment two-dimensional bar code each comprise a unique transaction number;
  2) The account and the payment information are split and stored in the first payment two-dimensional bar code and the second payment two-dimensional bar code;
  3) The first payment two-dimensional bar code and the second payment two-dimensional bar code respectively encrypt the payment information; and
  4) The first payment two-dimensional bar code stores a key that parses payment information of the second payment two-dimensional bar code, and the second payment two-dimensional bar code stores a key that parses payment information of the first payment two-dimensional bar code;
  alternately displaying the first payment two-dimensional bar code and the second payment two-dimensional bar code; and
  respectively identifying the first payment two-dimensional bar code and the second payment two-dimensional bar code to obtain intact payment information, sending the intact payment information to a payment center for verification, and if the verification succeeds, ending the payment.

\* \* \* \* \*